(12) United States Patent
Secor

(10) Patent No.: US 10,697,992 B1
(45) Date of Patent: Jun. 30, 2020

(54) AIRFLOW CAPTURE HOOD

(71) Applicant: Evergreen Telemetry LLC, Tempe, AZ (US)

(72) Inventor: Russell Peter Secor, Tempe, AZ (US)

(73) Assignee: Evergreen Telemetry LLC, Phoenix, AZ (US)

( * ) Notice: Subject to any disclaimer, the term of this patent is extended or adjusted under 35 U.S.C. 154(b) by 274 days.

(21) Appl. No.: 15/711,986

(22) Filed: Sep. 21, 2017

(51) Int. Cl.
*G01F 1/34* (2006.01)
*G01P 5/16* (2006.01)
*G01P 13/02* (2006.01)
*G01F 1/46* (2006.01)

(52) U.S. Cl.
CPC .............. *G01P 5/16* (2013.01); *G01F 1/34* (2013.01); *G01F 1/46* (2013.01); *G01P 13/02* (2013.01)

(58) Field of Classification Search
None
See application file for complete search history.

(56) References Cited

U.S. PATENT DOCUMENTS

| | | | | |
|---|---|---|---|---|
| 3,748,901 A * | 7/1973 | DeBaun | ............ | G01F 1/40 73/861.66 |
| 4,231,253 A * | 11/1980 | Ohnhaus | ............ | G01F 1/40 73/861.62 |
| 4,481,829 A | 11/1984 | Shortridge | | |
| 4,548,076 A | 10/1985 | Haake | | |
| 4,570,493 A * | 2/1986 | Leemhuis | ............ | G01F 1/42 73/861.62 |
| 4,807,667 A * | 2/1989 | Ohnhaus | ............ | G01F 1/40 138/45 |
| 8,578,790 B2 | 11/2013 | Secor | | |
| 8,757,008 B1 | 6/2014 | Nelson | | |
| 9,074,917 B2 | 7/2015 | Secor | | |
| 9,605,857 B2 | 3/2017 | Secor | | |
| 2016/0252114 A1 * | 9/2016 | Moss | ............ | F15D 1/02 138/39 |

OTHER PUBLICATIONS

Photo of a Shortridge Instruments airflow capture hood, retrieved on Sep. 20, 2017 and available at http://www.shortridge.com/.
Photo of a TSI/Alnor capture hood, retrieved on Sep. 20, 2017 and available at http://www.tsi.com/alnor-balometer-capture-hood-ebt731/.
Photo of an Evergreen Telemetry hood, retrieved on Sep. 20, 2017 and available at http://evergreentelemetry.com/Capture_Hood.html.

* cited by examiner

*Primary Examiner* — Jill E Culler
(74) *Attorney, Agent, or Firm* — Adam R. Stephenson, Ltd.

(57) ABSTRACT

Implementations of airflow capture hoods may include a central support coupled with a plurality of ribs configured to support a bottom end of a capture hood in an open position. The central support may be coupled with a plurality of poles configured to support an upper end of a capture hood in an open position.

15 Claims, 9 Drawing Sheets

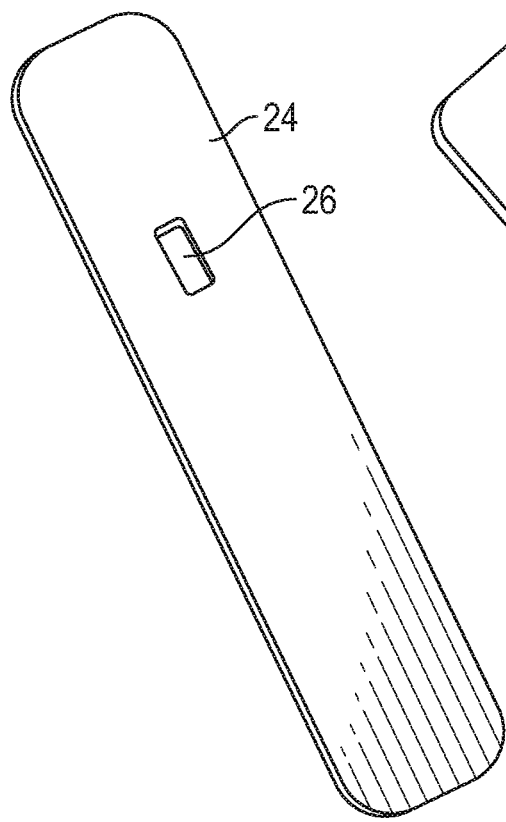
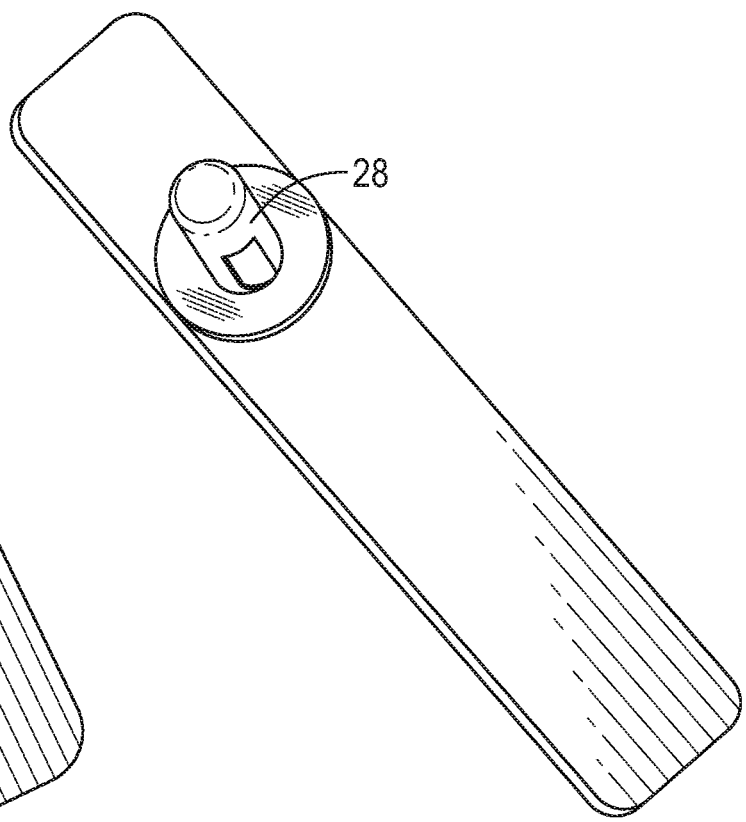
FIG. 3    FIG. 4
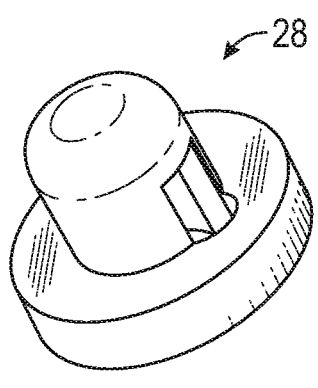
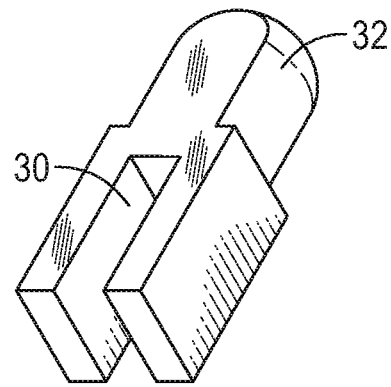
FIG. 5    FIG. 6

AIRFLOW CAPTURE HOOD

BACKGROUND

1. Technical Field

Aspects of this document relate generally to devices used to measure environmental parameters such as airflow. More specific implementations involve airflow capture hoods.

2. Background

Conventionally, HVAC systems are tested, balanced and adjusted using a number of different instruments, including an airflow capture hood. Airflow capture hoods may measure air volume flow from vents, diffusers and grilles by funneling air from the vent, diffuser or grille through a measurement grid at a base of the airflow capture hood. Airflow capture hoods are also able to measure the flow of air in the opposite direction, or as the air enters the vent, diffuser or grill.

SUMMARY

Implementations of airflow capture hoods may include a central support coupled with a plurality of ribs configured to support a bottom end of a capture hood in an open position. The central support may be coupled with a plurality of poles configured to support an upper end of a capture hood in an open position.

Implementations of airflow capture hoods may include one, all, or any of the following:

The central support of the hood may be inside a volume of the capture hood.

The hood may not include a rigid shell.

The hood may weigh less than 4 pounds.

The hood may include a pliable skirt configured to form the bottom end of the capture hood and the upper end of the capture hood.

Implementations of airflow capture hoods may include a pliable skirt and a plurality of ribs within an interior of the skirt, the plurality of ribs coupled to a base of the skirt. The airflow capture hood may also include a central support coupled at a center of the plurality of ribs and a plurality of poles coupled to the central support and coupled to a top portion of the skirt. The plurality of ribs may be configured to support the base of the skirt in an open position and the plurality of poles may be configured to support the top portion of the skirt in an open position.

Implementations of airflow capture hoods may include one, all, or any of the following:

The hood may include a plurality of skirt retainers coupled to an interior of the base of the skirt and configured to support the base of the skirt in an open position substantially parallel to the central support.

The plurality of skirt retainers may extend partially below the base of the skirt.

The hood may include a top frame coupled to the top portion of the skirt.

The top frame may be foldable upon itself.

The hood may include at least two magnets coupled to the top portion of the skirt.

The base of the skirt and the top portion of the skirt may include a two-way stretch vinyl material.

Implementations of airflow capture hoods may include a skirt and a plurality of ribs within an interior of the skirt, the plurality of ribs coupled to a base of the skirt. The hood may also include a shaft coupler having a first portion and a second portion, the first portion coupled to the second portion around a center of the plurality of ribs, a shaft coupled to the second portion of the shaft coupler, and a plurality of poles coupled to the shaft and coupled to a top portion of the skirt. The plurality of ribs are configured to support the base of the skirt in an open position and the first portion of the shaft coupler is configured to couple to a handle.

Implementations of airflow capture hoods may include one, all, or any of the following:

The plurality of ribs may be a measurement grid and may be configured to allow air to enter each rib at an opening in each rib.

The hood may include a sensor coupled to the shaft.

The hood may include a carrying strap coupled to the outside of the skirt.

The first portion of the shaft coupler and the second portion of the shaft coupler may be symmetrical about a center of the shaft coupler.

The hood may weigh less than four pounds.

The hood may include a pole mount coupled to the shaft and to the plurality of poles, wherein the poles are configured to enter the pole mount in relation to a length of the pole mount in one of a straight and an angled orientation.

The hood may include a foam coupled over a top edge of the top portion of the skirt.

The foam may be removably coupled over the top edge of the skirt using one of hook and loop fasteners, clips, straps, and spring tension within the foam.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 3 is a perspective view of a first implementation of a skirt retainer;

FIG. 4 is a perspective view of a second implementation of a skirt retainer;

FIG. 5 is a perspective view of the protrusion of the skirt retainer of FIG. 4;

FIG. 6 is a perspective view of a member that receives an end of a rib;

DESCRIPTION

This disclosure, its aspects and implementations, are not limited to the specific components, assembly procedures or method elements disclosed herein. Many additional components, assembly procedures and/or method elements known in the art consistent with the intended airflow capture hood (hereinafter "hood") will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such hoods, and implementing components and methods, consistent with the intended operation and methods.

Figure 1:
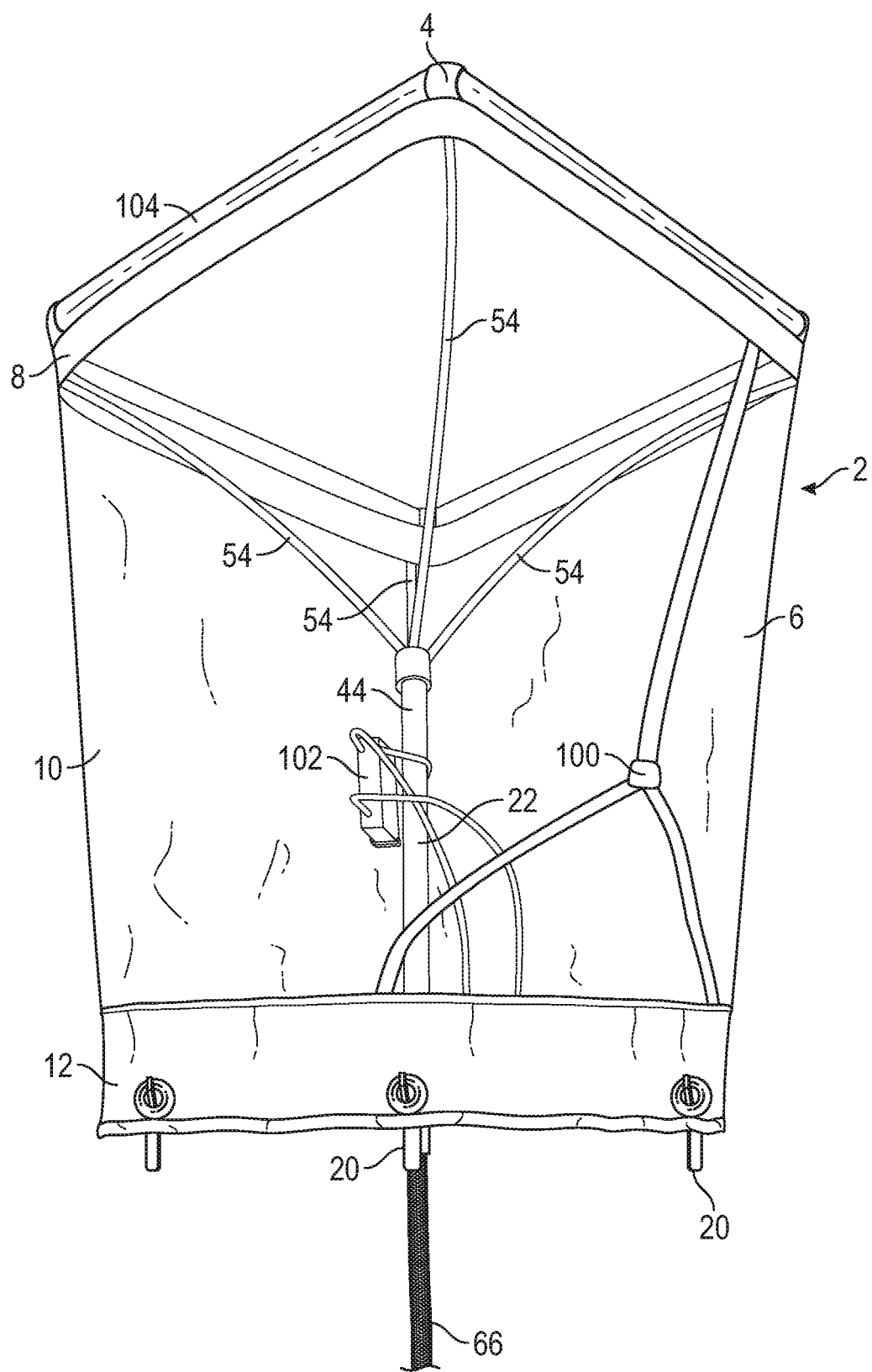
FIG. 1 is a side perspective view of an airflow capture hood.

Referring to FIG. 1, a side perspective view of an airflow capture hood is illustrated. The hood 2 is configured to measure airflow when a top end 4 of the hood 2 covers an air vent, diffuser or grille of a heating, ventilation, and air conditioning (HVAC) system. While this disclosure refers to the hood being used over diffusers, it is understood that the hood may be used over any type of inlet or outlet used to carry air or another gas. The hood 2 is capable of measuring both the airflow of air expelled from the diffuser and the airflow of air entering a return. The hood 2 may be a variety of sizes in order to enable the hood 2 to measure airflow through a variety of different sized diffusers. Various implementations of hoods and other related components disclosed herein may employ any of the components and/or related methods disclosed in the following: U.S. Pat. No. 9,605,857 to Russell Peter Secor, entitled "Wireless sensors system and method of using same," filed Aug. 11, 2011 and issued Mar. 28, 2017; U.S. Pat. No. 8,578,790 to Russell Peter Secor, entitled "Apparatus for Measurement of Ducted Air," issued Nov. 12, 2013; and U.S. Pat. No. 9,074,917 to Russell Peter Secor, entitled "Apparatus for Measurement of Ducted Air," issued Jul. 7, 2015, the disclosures of each of which are hereby incorporated entirely herein by reference.

The hood 2 includes a skirt 6. The skirt 6 may be made from a variety of lightweight materials, including, by non-limiting example, vinyl, nylon, and plastic. The skirt may be pliable. In various implementations, portions or all of the skirt may be transparent to allow a clear view through to the diffuser edges to assure proper alignment and a good seal between the hood 2 and the diffuser edges, ceiling, wall, or other surface contacting the hood 2. In other implementations, the skirt may be opaque, especially in implementations where a more rugged material, such as ripstop nylon, is used.

The skirt 6 includes a top portion 8. As illustrated in FIG. 1, the top portion 8 may be a different material from the middle portion 10 of the skirt 6. In particular implementations, the top portion may be made from a two-way stretch vinyl. The top portion 8 is coupled to a top frame that extends around the top edges of the skirt 6. The top frame supports the top portion 8 of the skirt and holds it in an open position. In various implementations, the top frame is sewn within the top portion 8 of the skirt 6, while in other implementations the top frame may be externally coupled to the top portion 8 of the skirt 6. The sections of the top frame may be made from a lightweight material such as carbon fiber, and in various implementations, the sections of the top frame may be hollow. The sections of the top frame may also be foldable upon themselves. In various implementations, each side/section of the frame may be coupled to adjacent sides of the frame through a flexible material which allows for the frame to fold upon itself. In one particular implementation, the flexible material is a rubber tube which couples over the ends of adjacent sections of the top frame, allowing them to move flexibly relative to each other and fold against each other as illustrated hereafter.

A seal 104 may be coupled over the top edge of the skirt. In other implementations, the seal 104 may be sewn within/to the top portion of the skirt. The seal may be, by non-limiting example, a foam, a plastic, or a rubber. In implementations where the seal is a foam, the foam may be a C-shaped roll of closed cell foam designed to couple over the edges of the top frame. The seal 104 provides a seal between the hood 2 and the surface upon which the hood is placed. The seal 104 also acts to prevent air coming from the diffuser or going into the return to leak around the top edge of the hood. Where the seal 104 is a C-shaped piece of foam, an adhesive may be coupled to the hollow interior of the foam and the hollow interior may be adhesively coupled to the top edge of the skirt 6. In various implementations, the material of the seal 104 may be made of a UV resistant material.

In various implementations, the seal may be removably coupled to the top of the skirt. As seals are subject to wear and may become dirty, it may be advantageous to have a replaceable seal to ensure a clean and proper fit between the hood and the surface surrounding the diffuser. The seal may be coupled to the top of the skirt using, by non-limiting example, hook and loop fasteners, adhesive, clips, straps, magnets, spring tension within the seal, or any other coupling means.

In various implementations, two or more magnets may be coupled to the top portion 8 of the skirt 6. The magnets may secure the hood to a surface surrounding a diffuser. The magnets may be coupled to the seal 104, coupled within the seal 104, coupled into the seal 104 coupled to the top portion 8, or coupled within the top portion 8. The magnets may be in various implementations, by non-limiting example, neodymium magnets, ferrite magnets, or other rare earth magnets, The skirt 6 includes a base 12. The base may be made of similar materials as the top portion 8, including a two-way stretch vinyl. In various implementations, the base 12 includes an elastic material coupled within the layers of the material of the base 12. The elastic material may be rubber tubing. In various implementations, the base 12 may include multiple elastics (or rubber tubes) sewn in rings within the layers of the base 12. In a particular implementation, the base has a rubber tube sewn within the base above a plurality of grommets and a second rubber tube sewn within the base below the plurality of grommets. The rubber tubes may extend around the circumference of the base. The base 12 does not include a rigid section like the sections of the top frame in the top portion; rather, the base remains pliable and it forms an opening that is supported by internal supports against which the elastics of the base hold the base using an elastic bias force. In implementations where the base 12 is made from a stretch vinyl and includes rubber tubing within the base 12, the base may be stretched open to various circumferential dimensions due to the elastic nature of the base.

Figure 2:
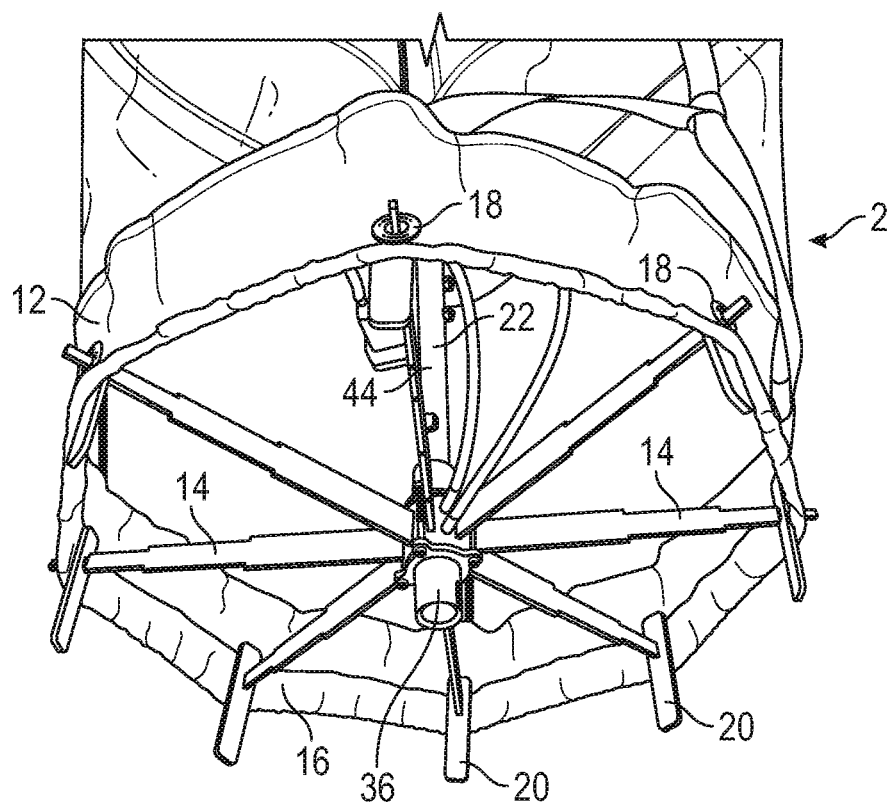
FIG. 2 is a bottom perspective view of a bottom portion of an airflow capture hood.

Referring to FIG. 2, a bottom perspective view of a bottom portion of an airflow capture hood is illustrated. The hood 2 includes a plurality of ribs 14 which form the internal supports which are used to hold the base 12 in the open position. The ribs 14 are at least partially within the interior of the skirt 6, and in the implementation illustrated by FIGS. 1 and 2, the plurality of ribs 14 are entirely within the interior of the skirt 6 with the exceptions of the ends of the ribs 14 protruding through openings in the skirt. The plurality of ribs 14 are configured to support a base 12 of the skirt or a bottom end 16 of the hood 2 and to ensure that the base 12 or bottom end of the hood is in an open position against the bias force of the elastics in the base. As illustrated, the hood 2 implementation has no rigid shell or solid ring that supports and holds open the base 12; rather, the support for the open structure of the base 12 is derived entirely from the plurality of ribs 14. As illustrated by FIG. 2, the plurality of ribs 14 spans the opening at the bottom of the hood 16 and the ends of the ribs 14 extend through a plurality of grommets 18 in the base 12 of the skirt 6. In other implementations, the plurality of ribs does not extend through the base 12 but only couples to the interior of the base 12, thereby pushing against the inside of the base 12 against the elastics of the base. The plurality of ribs may contact the base 12 at as few as three different points. The plurality of ribs 14 illustrated in FIG. 2 contact the base at eight points, and in other implementations, the plurality of ribs may contact the base at more or less than eight points.

The plurality of ribs 14 may include any number of ribs. While the particular implementation illustrated by FIG. 2 has eight ribs, other implementations may have more or less than eight ribs, down to potentially three ribs. Further, the plurality of ribs 14 may include various arrangements of ribs as well as various designs and sizes of ribs. While the plurality of ribs 14 illustrated in FIG. 2 are in a spoked pattern, other implementations may include a plurality of ribs intersecting one another or a plurality of ribs including branched ribs. The ribs may also decrease in size from a central location of the plurality of ribs 14 to the base 12, while in other implementations the size of the ribs may be constant along their length.

The plurality of ribs 14 forms what is referred to as a measurement grid, also referred to herein as "grid", for the hood 2. Airflow capture hoods use a grid in order to measure the airflow through the hood. Each rib of the plurality of ribs has at least one hole in each rib. Air enters each rib at the opening and is received by the airflow sensor of the hood enabling a measurement of airflow to be taken.

In various implementations, the hood 2 may include a plurality of skirt retainers 20. The skirt retainers 20 may be coupled to the interior of the base 12 of the skirt 6. In other implementations, the skirt retainers may be at least partially within the material of the base 12 of the skirt 6. The skirt retainers 20 may be held in place by pressure between the plurality of ribs and the base 12 of the skirt 6. The position of the skirt retainers along the ribs of the grid largely determines the effective diameter of the open area of the base of the hood. In implementations including the plurality of skirt retainers, the skirt retainers 20 further support and give shape to the base 12 of the skirt 6, or the bottom 16 of the hood 2 holding the material bottom edge of the base 12 in a consistently vertical orientation. The skirt retainers 20 extend substantially perpendicularly to the ribs, and in turn, the skirt retainers 20 keep the walls of the base 12 of the skirt 6 substantially parallel to the central support 22, or substantially perpendicular to the grid. In various implementations the skirt retainers 20 may extend below the base 12 of the skirt 6, as is illustrated in FIGS. 1 and 2. In such implementations, the plurality of skirt retainers also serve as a plurality of legs that the hood 2 can rest on when placed on the floor or another surface.

Referring to FIG. 3, a perspective view of a first type of skirt retainer is illustrated. The skirt retainer illustrated in FIG. 3, along with all other skirt retainers in this application, is made from a rigid material. The skirt retainers may be made from, by non-limiting example, plastic, carbon fiber, or metal. The front side 24 of the skirt retainer shown in FIG. 3 may be identical to the back side of the skirt retainer. The skirt retainer includes a hole 26 or slot that allows for a rib to extend through the skirt retainer and against or through the base of a skirt. The skirt retainers may vary in size. In a particular implementation, each skirt retainer may be 3.75 inches tall, 0.75 inches wide, and 0.125 inches thick, however, in other implementations each skirt retainer may be more or less tall, wide, and thick than these dimensions.

Referring to FIG. 4, a perspective view of a second type of skirt retainer is illustrated. In various implementation, the skirt retainer may be similar to the skirt retainer illustrated in FIG. 3 except that it includes a protrusion 28 covering at least a portion of a hole or slot on one side of the skirt retainer. Referring to FIG. 5, a perspective view of the protrusion of the skirt retainer of FIG. 4 is illustrated. A rib may extend partially through the skirt retainer through the hole or slot in the back of the slot retainer and extend into the protrusion 28. The protrusion 28 covers and protects the end of the rib. This may be useful particularly where the rib is made of a plastic or other brittle material which may be more easily broken through contact with hard objects. Other similar methods to protect the end of a rib exist. For example, referring to FIG. 6, a perspective view of a member that receives an end of the rib is illustrated. In this implementation, the member includes a rib receiving portion 30. The member also includes a skirt coupler 32. Because the skirt coupler 32 extends against or through a base of a skirt, the ribs may be able to support the opening of the hood while remaining covered and protected as the ribs never directly contact the hood. The member illustrated in FIG. 6 may be used in conjunction with a skirt retainer or may be used without a skirt retainer.

Figure 7:
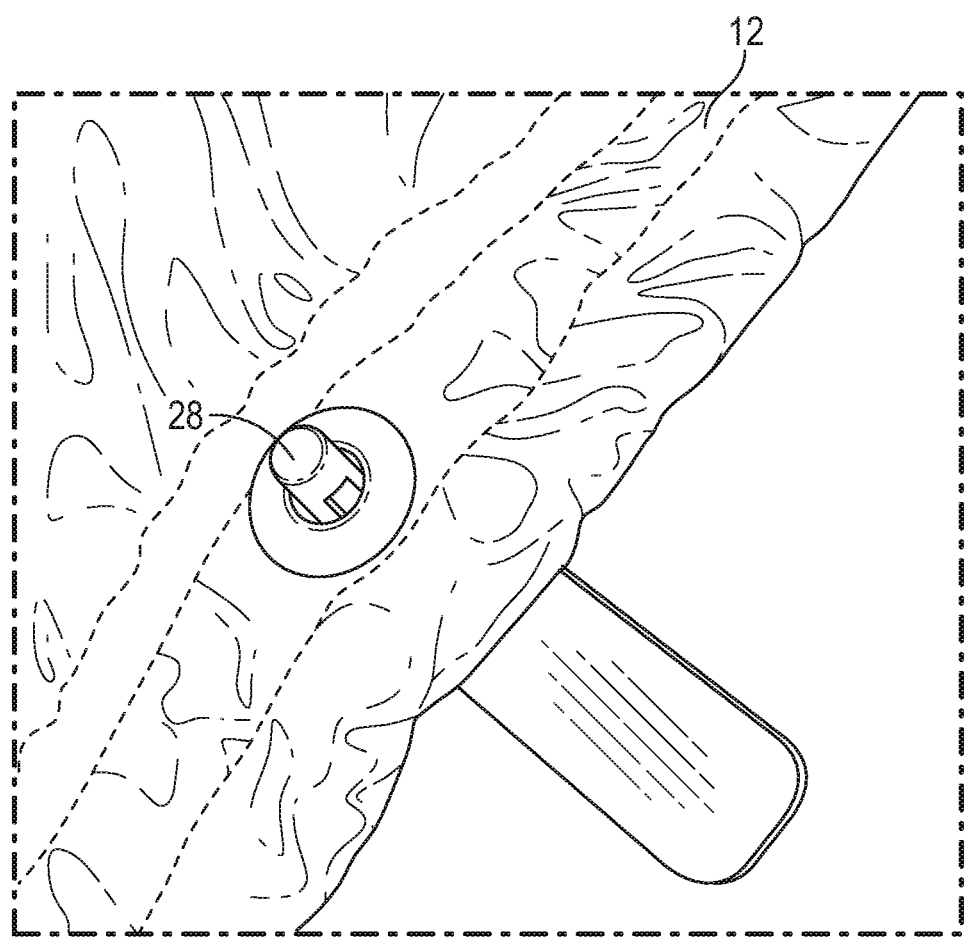
FIG. 7 is a magnified view of a skirt retainer coupled to a skirt.

Referring to FIG. 7, a magnified view of a skirt retainer coupled to a skirt is illustrated. The protrusion 28 of the skirt retainer extends through a grommet in the base 12 of the skirt 6 along with the portion of the rib that extends through the grommet as well.

Referring back to FIGS. 1 and 2, the hood 2 includes a central support 22. As illustrated, the central support is at least partially within the interior, or the volume, of the skirt 6 and the hood 2. The central support provides the hood 2 the support necessary to keep its open shape even though the hood does not include a rigid base, a rigid skirt, or a rigid top section.

Figure 8:
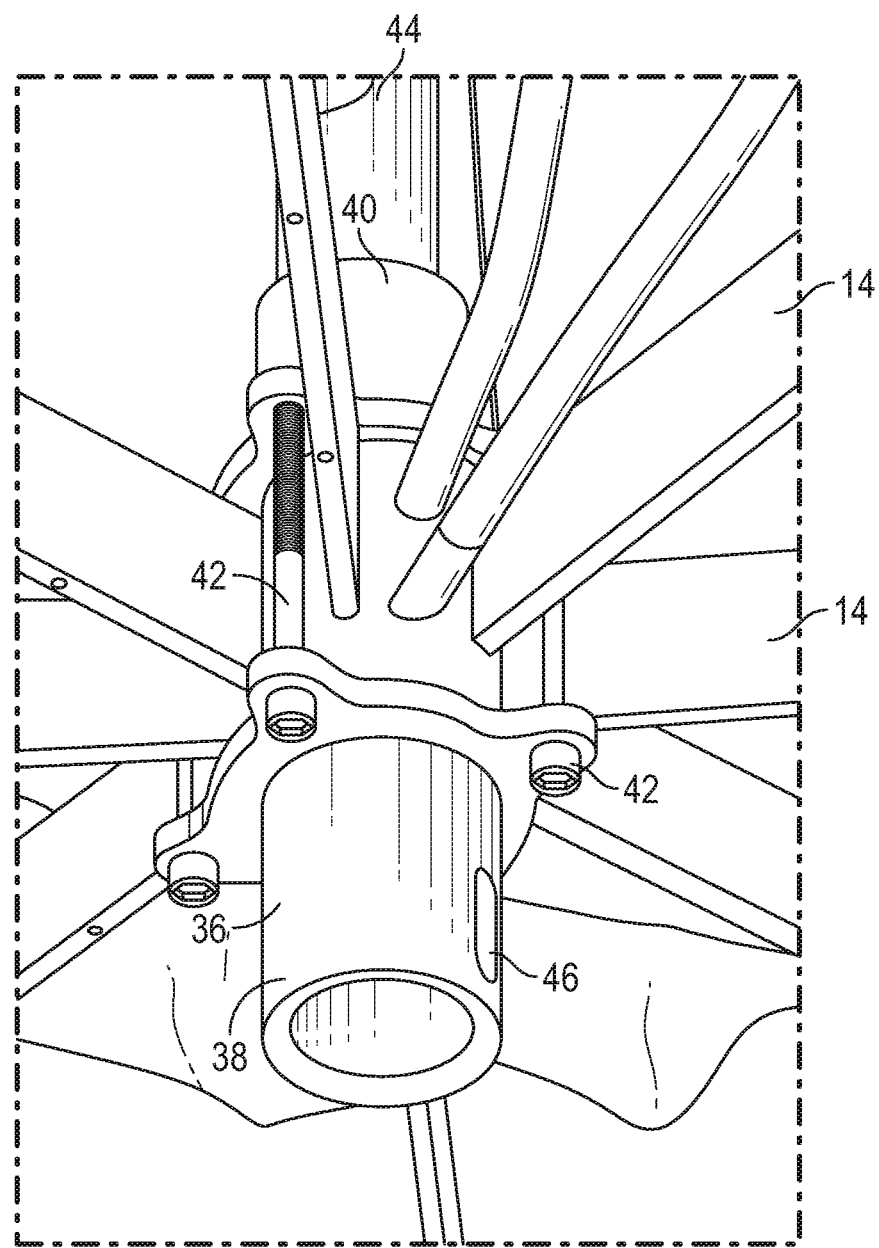
FIG. 8 is a magnified perspective view of a shaft coupler.

Referring specifically to FIG. 2, the central support includes a shaft coupler 36. The shaft coupler bridges the plurality of ribs at the center of the plurality of ribs 14. FIG. 8 is a magnified perspective view of the shaft coupler. As seen in FIG. 8, the shaft coupler includes a first portion 38 and a second portion 40. In various implementations, the first portion 38 and the second portion 40 may be symmetrical about a center of the shaft coupler 36. The first portion 38 is coupled to the second portion 40 with the plurality of ribs 14 between the first portion 38 and the second portion 40. The first portion 38 is coupled to the second portion 40 using bolts 42 or any other type of coupling mechanism. In various implementations, the shaft coupler may include four bolts that couple the first portion 38 to the second portion 40.

By bridging the shaft coupler 36 across the plurality of ribs 14, the amount of stress on the plurality of ribs 14, or grid, may be reduced as the majority of stress is absorbed by the central support 22.

The first portion 38 may be configured to receive a handle and the second portion 40 may be configured to receive a shaft 44 of the central support. The interior of the first portion 38 and the interior of the second portion 40 may be threaded in various implementations, though they may not be threaded in others. In such threaded implementations, the interiors of the first and second portion may be acme threaded. In various implementations, the first portion 38 and the second portion 40 may include two or more slits or holes 46 in the sidewalls of the first portion and the second portion. The holes or slits 26 may correspond with two or more spring loaded blades/clips on the side of a handle or the shaft 44. Further, in various implementations the holes or slits 26 may be configured to have a cotter or other locking pin pass through them to secure a handle or shaft to the shaft coupler 36. In other implementations, a wide variety of coupling mechanisms may also be used to couple the shaft coupler to a handle and/or a shaft, such as, by non-limiting example, quick connects, locking buttons, spring biased buttons, and the like.

Referring back to FIGS. 1 and 2, the central support 22 may include a shaft 44. The shaft extends into the interior of the skirt 6 and towards the top end 4 of the hood 2. In the implementation illustrated by FIG. 1, the shaft 44 does not extend to the top of the hood 2, however, in other implementations the shaft 44 may extend upwardly up to the top end 4 of the hood 2. In still other implementations, no shaft is included, rather a plurality of poles as later described herein may couple to the shaft coupler 36 without a shaft 44.

Figure 9:
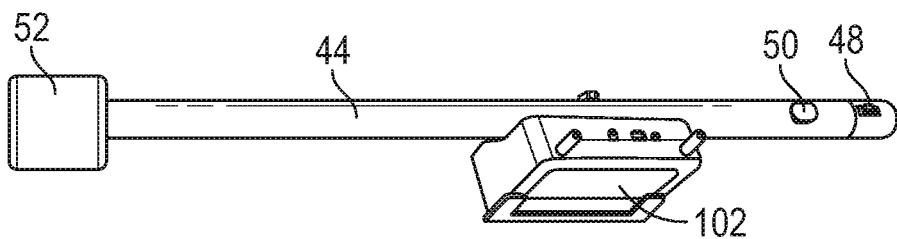
FIG. 9 is a side view of a shaft coupled to a pole mount and a sensor.

Referring to FIG. 9, a side view of a shaft coupled to a pole mount and a sensor is shown. Shaft 44 includes a coupling mechanism, such as spring loaded blades 48, to couple the shaft 44 to the second portion 40 of the shaft coupler 36. In various implementations, such as the one illustrated by FIG. 9, the shaft 44 includes a decoupling mechanism, such as button 50, to decouple the shaft 44 from the second portion 40 of the shaft coupler 36.

The central support includes a pole mount 52. In various implementations, the pole mount 52 may be part of the shaft 44, however, in other implementations the pole mount 52 is separately coupled to the shaft 44. The pole mount 52 is configured to receive poles that will couple the top portion 8, or upper end, of the skirt 6 with the central support 22. In the implementation illustrated FIG. 1, the pole mount is configured to receive four poles 54, however, other pole mounts may be configured to receive more or less than four poles 54. In various implementations, the poles extend both horizontally and vertically from the shaft 44 to the top portion 8 of the skirt 12. In such implementations, the poles 54 support the structure of the hood in multiple ways to keep the top portion 8 of the skirt 6 spread out and separated from the base 12 and the hood open at the top end 4 of the hood 2. The poles may be made from, by non-limiting example, carbon fiber, fiberglass, plastic, or metal. The poles may be flexible and in various implementations, the poles may be made from the same material as tent poles.

Figure 10:
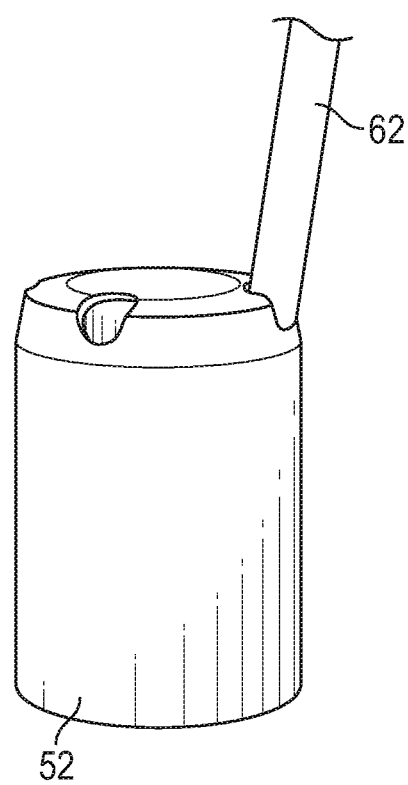
FIG. 10 is a perspective view of a pole mount with a pole entering the pole mount at an angled orientation.
Figure 11:
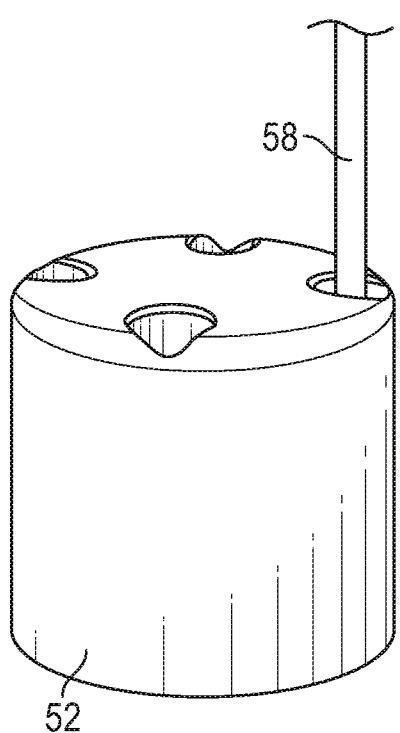
FIG. 11 is a perspective view of a pole mount with a pole entering the pole mount at a straight orientation.

The pole mount 52 may or may not be configured to receive poles at an angled orientation in relation to a length of the pole mount 52. Referring to FIG. 10, a perspective view of a pole mount with a pole entering the pole mount at an angled orientation is illustrated. In this implementation, the holes which receive the end of the pole are angled relative to the length of the pole mount, causing the poles to sit into the holes at an angle. Referring to FIG. 11, a perspective view of a pole mount with a pole entering the pole mount 52 at a straight orientation is illustrated. In such an implementation, the holes are formed substantially parallel with the longest length of the pole mount making the poles sit substantially vertically into the holes. Whether or not the pole mount 52 is configured to receive poles in an angled or straight orientation depends on a variety of factors, such as, by non-limiting example, the flexibility of the poles, the height of the shaft 44, and the width of the opening at the top end 4 of the hood 2.

Figure 12:
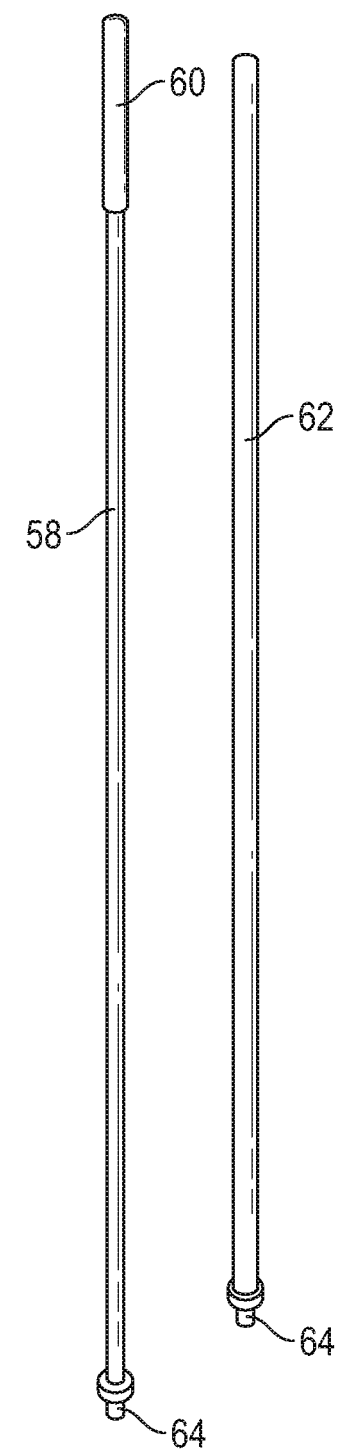
FIG. 12 is a perspective side view of two different poles.

Referring to FIG. 12, a perspective side view of two different poles are illustrated. In various implementations, the hood 2 may include thinner poles 58 that extend from the pole mount 52 to the top portion 8 of the skirt 6. The thinner poles 58 are more flexible and in turn may enter the pole mount 52 in a straight configuration, as illustrated by FIG. 11. The thinner poles 58 may include a metal casing 60 at one end to ensure a proper fit between the pole 58 and the pole mount 52. In other implementations, particularly implementations where the hood 2 is measuring a greater airflow, thicker poles 62 may be required to ensure that the hood 2 maintains its shape while measuring the higher airflow. In such implementations, due to the decreased flexibility of thicker poles, the poles may be coupled to the pole mount 52 at an angled orientation as illustrated by FIG. 10. The poles may include studs 64 on an end of the poles use to secure the poles to grommets within the top portion 8 of the skirt 12.

Referring back to FIG. 1 and FIG. 9, the hood includes at least one sensor 102. The sensor 102 is coupled to the grid and measures the airflow through the hood. The sensor 102 may be coupled to any portion of the hood 2. In specific implementations, the sensor may be coupled to the shaft 44, coupled to an inside or outside of the skirt 6, or held in a pocket coupled to the hood 2. In implementations with a pocket, the sensor may be held in a pocket coupled directly to or within the material of the skirt. The sensor 102 may be coupled to the hood 2 through, by non-limiting example, straps, clips, hook and loop fasteners, or any other coupling mechanism. In various implementations, the hood includes more than a single sensor. In such implementations, the hood may include, by non-limiting example, multiple airflow sensors, a temperature sensor, pressure sensors, and humidity sensors. A display may be coupled to the hood on which a user can read test results from the sensors. Any of the various sensor types and displays may be employed in various implementation that were disclosed in the patents to Secor which were previously incorporated by reference herein.

Referring back to FIG. 1, a handle 66 may be coupled to the hood 2. In implementations with a shaft coupler, the handle 66 may be coupled to the first portion of the shaft coupler. The handle may be of varying lengths and designs. Because the hood 2 is often used against diffusers in high ceilings, a handle 66 may be necessary to securely hold the hood 2 against the ceiling to measure airflow from a diffuser.

Figure 13:
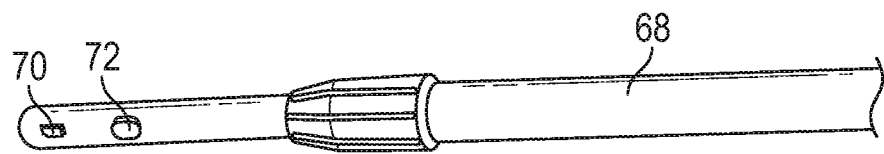
FIG. 13 is a side view of an end of a first type of handle.

Referring to FIG. 13, a side view of a first type of handle is illustrated. The handle 68 may be a straight handle. The handle 68 may be configured to fit within a first portion of a shaft coupler. As illustrated in FIG. 13, the handle 68 includes a coupling mechanism, such as spring loaded blades 70, to couple the handle 68 to a first portion of the shaft coupler. In various implementations, such as the one illustrated by FIG. 13, the handle 68 includes a decoupling mechanism, such as button 72, to decouple the handle 68 from the first portion of the shaft coupler. In other implementations the handle may screw into a threaded portion of the shaft coupler. In still other implementations, the handle may be a pipe that fits over the first portion of a shaft coupler and is coupled to the shaft coupler using a cotter pin. The handle, as illustrated in FIG. 13, may be extendable. In a particular implementation, the handle is marketed under the tradename RUBBERMAID® by Rubbermaid Incorporated of Atlanta, Ga. In various implementations, various types of mop handles may be used as the handle coupled to the hood.

Figure 14:
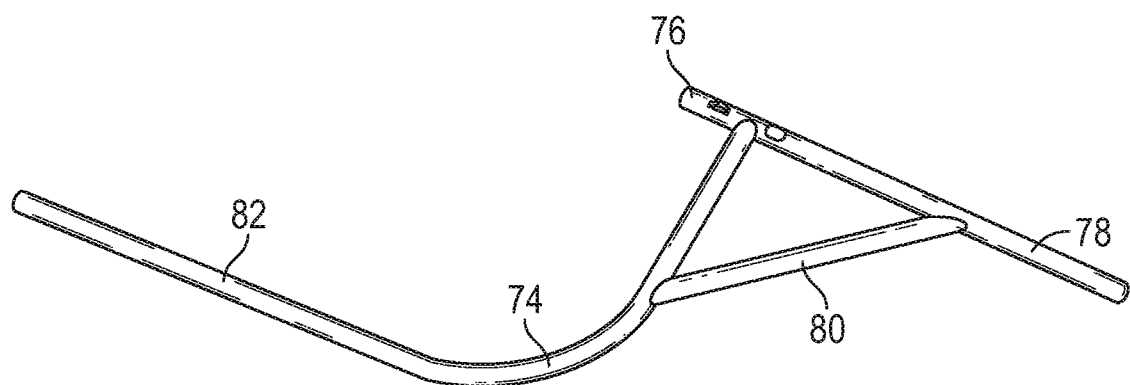
FIG. 14 is a perspective side view of a second type of handle.

Referring to FIG. 14, a perspective side view of a second type of handle is illustrated. The handle 74 has multiple holding positions for a user. The handle 74 couples to a hood at a coupling portion 76 of the handle. The handle may couple to the hood using any mechanism disclosed herein and may couple to the hood at the shaft coupler. The handle 74 include a first holding portion 78, a second holding portion 80, and a third holding portion 82. The plurality of holding portions may make it easier for the user to hold a hood against a lower ceiling or carry and use the hood using two hands rather than one hand.

Figure 16:
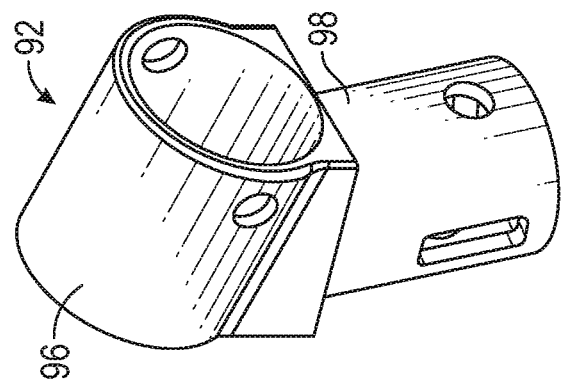
FIG. 16 is a perspective view of an adaptor.
Figure 15:
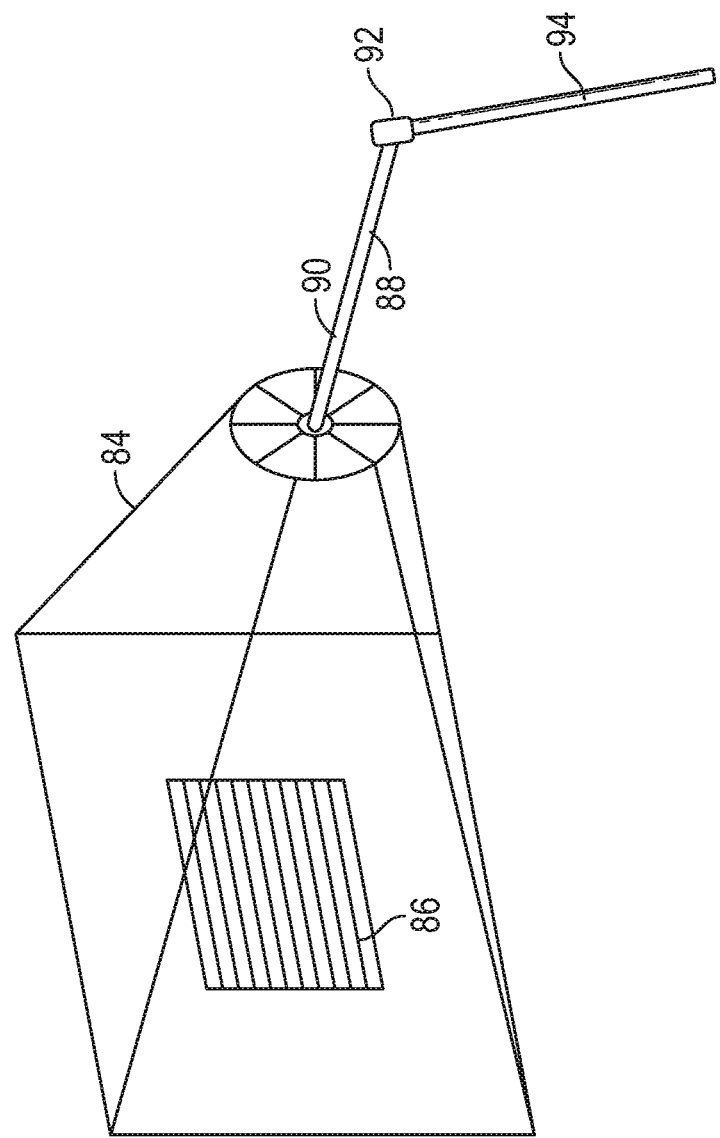
FIG. 15 is a perspective view of an airflow capture hood positioned against a wall with an angled handle.

Hoods are used to measure airflow not just out of ceiling diffusers, but also airflow from diffusers in a vertical wall surface. Referring to FIG. 15, a perspective view of an airflow capture hood positioned against a wall with an angled handle is illustrated. In various implementations, a hood 84 may be coupled to a wall over a diffuser 86. A handle 88 may be coupled to the hood 84. The handle 88 may include a horizontal portion 90, an adaptor 92, and an angled portion 94. A user may use the horizontal portion 90, the angled portion 94, or both the horizontal and angled portion to support the hood 84 against a wall. In various implementations, the angled portion 94 is angled at 15 degrees from perpendicular to the horizontal portion 90. In other implementations, the angled portion 94 may be angled more or less than 15 degrees from perpendicular. Referring to FIG. 16, a magnified view of an adaptor 92 is illustrated. The adaptor has a first portion 96 which may couple to the horizontal portion 90 of the handle 88. The adaptor has a second portion 98 which may couple to the angled portion 94 of the handle 88. A pipe may be used as either the horizontal portion 90 and/or the angled portion 94 of the handle 88. The pipe may be coupled to the adaptor using a cotter pin. As with all hood implementations disclosed herein, the pipes and handles may be have many different lengths as desired, and use of pipes may allow the hood to be used for a wide variety of ceiling and/or wall heights.

Figure 17:
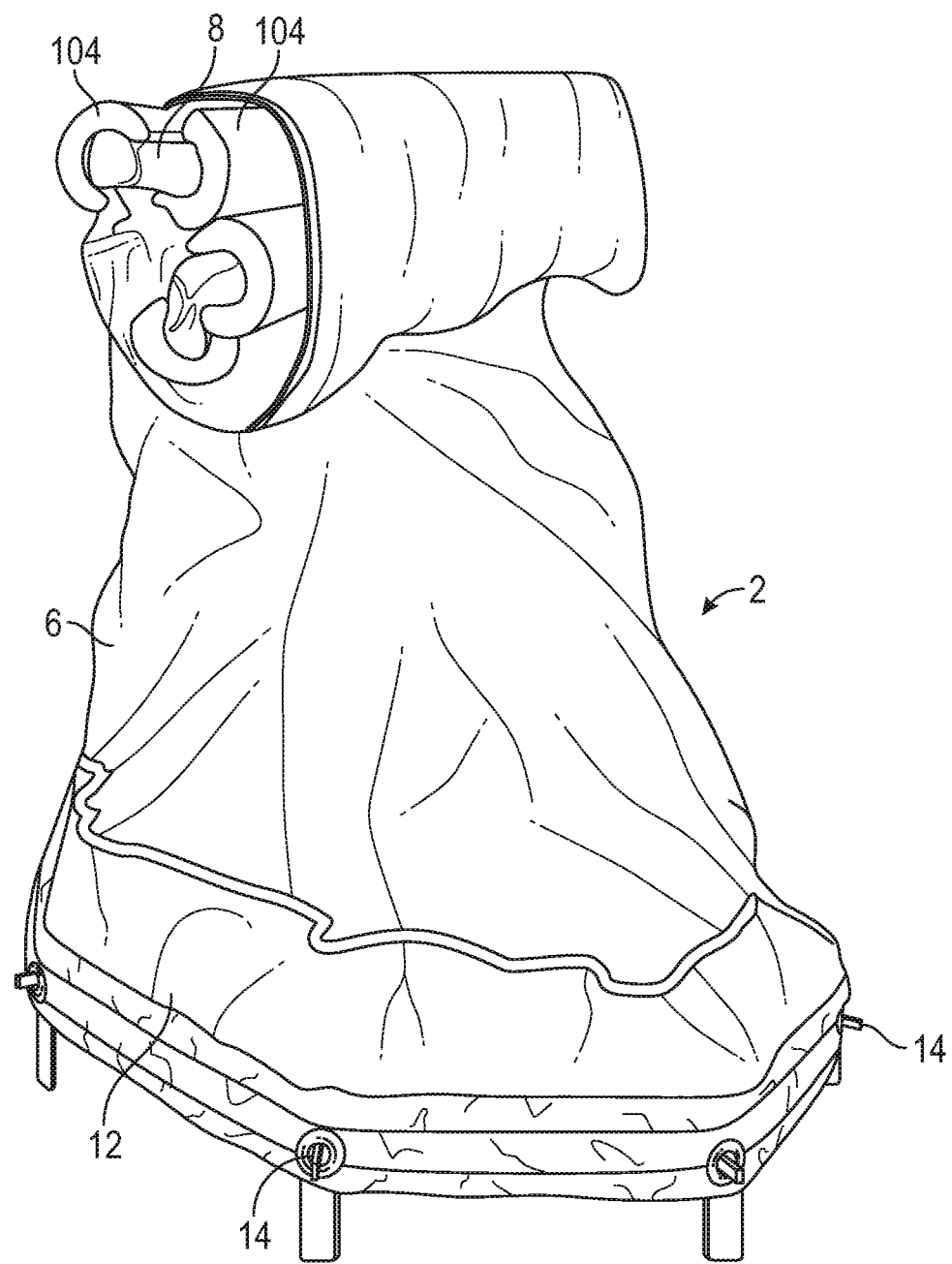
FIG. 17 is a perspective view of the airflow capture hood in a partially collapsed state.

Referring to FIG. 17, a perspective view of an airflow capture hood in a partially collapsed state is illustrated. After use, the hood 2 may be collapsed, allowing the hood to be easily transported and stored with minimal storage space requirements. The hood may be collapsed by first removing the poles and the central support from the shaft coupler. As clearly seen in FIG. 17, the top frame (if included in the hood), seal 104 (if included in the hood), and the top portion 8 of the skirt 6 are foldable upon themselves through the flexible tubing and the sections in the top portion. After the top portion 8 is folded, the remainder of the skirt can be rolled up around the folded top portion 8 of the skirt 6 as illustrated in FIG. 17. While the plurality of ribs 14 is shown still coupled to the base 12 of the skirt 6, it is readily understood that the ribs could also be removed from the base if desired. When the ribs are removed from the base 12 of the skirt 6, the base may be easily completely rolled up with the remainder of the skirt as the base is pliable. In a fully collapsed state (with the ribs still inserted into the bottom of the hood or removed from the hood), the hood 2 may be transported in a very compact state and may fit in a space at least as small as a duffel bag. This is in contrast with conventional hoods which generally require a large hard case to be used to transport them to enclose the rigid bases and upper portions associated with the hood.

In addition to the hood 2 being easily transportable in a collapsed state, the hood 2 is easily transportable in an assembled state as well. Referring back to FIG. 1, a carrying strap 100 may be coupled to the skirt 6. The carrying strap 100 may be held by a user and/or hung over a user's shoulder to easily transport the hood from one diffuser to another. The carrying strap may be coupled at both ends to the hood through hook and loop fasteners coupled at the upper and lower portions of the hood.

The implementations of the hood disclosed herein may weigh less than four pounds. In specific implementations, the hood with a handle weighs 3.4 pounds. The weight of the hood is so low due to use of lightweight materials (like aluminum) and using the plurality of ribs, or the grid, as the support for the skirt in combination with the central support and the shaft coupler. Using the grid in this manner eliminates the need for an additional rigid base or solid ring at the bottom of the hood to support the hood. The ease of using and transporting the hood may be increased due to the low weight of the hood. Further, because of the low weight of the hood, magnets can be used to secure the hood to a wall or a ceiling while the hood is in use. Because of this, the hood can be held to a diffuser or return using magnetic force only and not requiring the user to hold the handle. This may significantly improve productivity as the user now no longer has to place either a fixed support under the hood to hold it in position while measurements are taken and adjustments done, or stand under the hood holding it in place to get measurements. Hoods that weight more than 3.4 pounds generally are unable to be held against the diffuser or return using magnetic force alone.

In places where the description above refers to particular implementations of airflow capture hoods and implementing components, sub-components, methods and sub-methods, it should be readily apparent that a number of modifications may be made without departing from the spirit thereof and that these implementations, implementing components, sub-components, methods and sub-methods may be applied to other airflow capture hoods.

What is claimed is:

1. An airflow capture hood comprising:
   a pliable skirt;
   a plurality of ribs within an interior of the pliable skirt, the plurality of ribs coupled to a base of the pliable skirt;
   a central support coupled at a center of the plurality of ribs; and
   a plurality of poles coupled to the central support and coupled to a top portion of the pliable skirt;
   wherein the plurality of ribs are configured to support the base of the pliable skirt in an open position; and
   wherein the plurality of poles are configured to support the top portion of the pliable skirt in an open position.

2. The airflow capture hood of claim 1, further comprising a plurality of skirt retainers coupled to an interior of the base of the pliable skirt and configured to support the base of the pliable skirt in an open position substantially parallel to the central support.

3. The airflow capture hood of claim 2, wherein the plurality of skirt retainers extend partially below the base of the pliable skirt.

4. The airflow capture hood of claim 1, further comprising a top frame coupled to the top portion of the pliable skirt.

5. The airflow capture hood of claim 4, wherein the top frame is foldable upon itself.

6. The airflow capture hood of claim 1, further comprising at least two magnets coupled to the top portion of the pliable skirt.

7. The airflow capture hood of claim 1, wherein the base of the pliable skirt and the top portion of the pliable skirt comprise a two-way stretch vinyl material.

8. An airflow capture hood comprising:
a skirt;
a plurality of ribs within an interior of the skirt, the plurality of ribs coupled to a base of the skirt;
a shaft coupler comprising a first portion and a second portion, the first portion coupled to the second portion around a center of the plurality of ribs;
a shaft coupled to the second portion of the shaft coupler; and
a plurality of poles coupled to the shaft and coupled to a top portion of the skirt;
wherein the plurality of ribs are configured to support the base of the skirt in an open position; and
wherein the first portion of the shaft coupler is configured to couple to a handle.

9. The airflow capture hood of claim 8, wherein the plurality of ribs is a measurement grid, wherein the plurality of ribs is configured to allow air to enter each rib at an opening in each rib.

10. The airflow capture hood of claim 8, further comprising a sensor coupled to the shaft.

11. The airflow capture hood of claim 8, further comprising a carrying strap coupled to the outside of the skirt.

12. The airflow capture hood of claim 8, wherein the first portion of the shaft coupler and the second portion of the shaft coupler are symmetrical about a center of the shaft coupler.

13. The airflow capture hood of claim 8, wherein the hood weighs less than four pounds.

14. The airflow capture hood of claim 8, further comprising a pole mount coupled to the shaft and to the plurality of poles, wherein the poles are configured to enter the pole mount in relation to a length of the pole mount in one of a straight and an angled orientation.

15. The airflow capture hood of claim 8, further comprising a foam coupled over a top edge of the top portion of the skirt, wherein the foam is removably coupled over the top edge of the skirt using one of hook and loop fasteners, clips, straps, and spring tension within the foam.

\* \* \* \* \*